Figure 1:
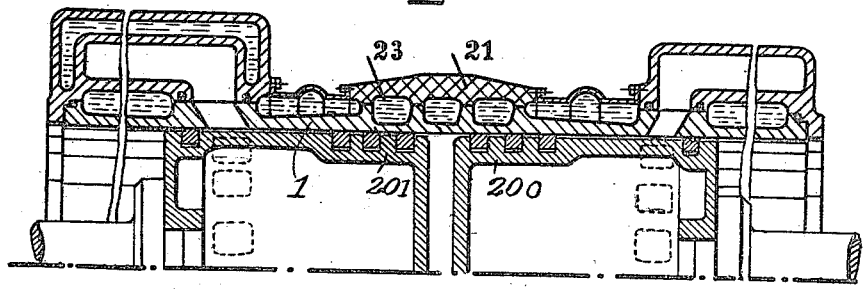

H. JUNKERS.
CYLINDER OF INTERNAL COMBUSTION ENGINES AND OTHER SIMILAR MACHINES.
APPLICATION FILED JUNE 25, 1913.

1,231,903.

Patented July 3, 1917.

3 SHEETS—SHEET 1.

Witnesses:
Emil Wergien
Hermann Tischer.

Inventor:
Hugo Junkers.

H. JUNKERS.
CYLINDER OF INTERNAL COMBUSTION ENGINES AND OTHER SIMILAR MACHINES.
APPLICATION FILED JUNE 25, 1913.

1,231,903.

Patented July 3, 1917.
3 SHEETS—SHEET 3.

Witnesses:
Emil Wergien
Hermann Tischer.

Inventor:
Hugo Junkers

UNITED STATES PATENT OFFICE.

HUGO JUNKERS, OF AACHEN, GERMANY.

CYLINDER OF INTERNAL-COMBUSTION ENGINES AND OTHER SIMILAR MACHINES.

1,231,903.  Specification of Letters Patent.  Patented July 3, 1917.

Application filed June 25, 1913. Serial No. 775,693.

*To all whom it may concern:*

Be it known that I, HUGO JUNKERS, a citizen of the German Empire, residing at Aachen, Nr. 68 Bismarckstr., Kingdom of Prussia, German Empire, have invented certain new and useful Improvements in and Relating to the Cylinders of Internal-Combustion Engines and other Similar Machines; and I do hereby declare the following to be a full, clear, and exact description of the invention, such as will enable others skilled in the art to which it appertains to make and use the same.

This invention involves the provision of certain improvements in the construction of the cylinder structure of an internal combustion engine of the type having two pistons which reciprocate simultaneously in opposite directions in the same cylinder. In such an engine, the central portion of the cylinder structure bounding the combustion chamber is subjected to the great strain resulting from the combustion pressure and its strength is necessarily impaired by the openings provided in the cylinder wall for the reception of the devices employed for the injection of the combustion material, the escape of the products of combustion, indicators, safety devices and the like. In this respect, such an engine is markedly different from a single piston engine wherein the combustion chamber is bounded in part by a cylinder head of relatively great strength and the necessary valve devices are located in this head. This difference between single piston and double piston engines and the relatively greater danger of cracking of the cylinder of a double piston engine, particularly cracking through the valve openings, has retarded the realization of the advantages incident to the use of double piston engines, especially as the danger of cracking of the cylinder may not be guarded against sufficiently by increasing the thickness of the wall of the cylinder since such increase of thickness increases the difficulty in carrying off the heat taken up by the cylinder wall from the burning gases in the combustion chamber.

This invention relates to the construction of the working cylinder of an internal combustion engine of the type employing double pistons, whereby the objections above referred to are overcome. In accordance with the invention, the cylinder of the engine is formed of a relatively thin liner of insufficient strength in itself to withstand the intense pressure developed within it and a cooling liquid is applied directly to the exterior surface of this thin liner to carry off heat therefrom. The liner is strengthened and the strain of the internal pressure taken up by a ring or rings which closely encircle the portion of the liner constituting the combustion chamber and the parts adjacent thereto. Such a ring may make a driving fit upon the liner or it may be shrunk upon the liner, the latter construction being preferred. The construction of the ring is such as to permit the application of the cooling liquid directly to the liner and also the insertion of the valve devices through openings leading to the interior of the combustion chamber. In fact, the ring is specially constructed so as to reinforce the cylinder structure at the openings provided for the valve devices because of the weakening resulting from the presence of such openings.

Figure 2:
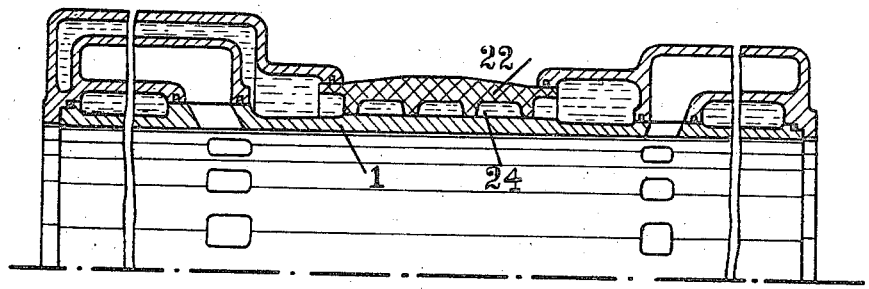
Figure 3:
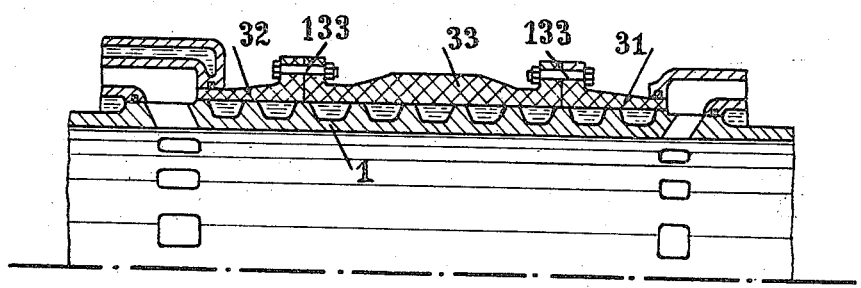

I have illustrated constructions embodying the invention in the accompanying drawings, in which Figures 1, 2 and 3 are longitudinal sections of the cylinder structures of double piston engines, the liner in each of these constructions being a single piece. Figs. 4, 5, 6, 7, 8 and 9 show different constructions which may be employed in the strengthening rings and Figs. 10 to 17 show constructions which may be employed about the opening leading to the interior of the combustion chamber for the admission of the combustible fuel.

All of the figures of the drawings show a cylinder structure consisting of a relatively thin liner forming a guide for the two pistons which reciprocate within the liner in opposite directions simultaneously. The two pistons are shown in Fig. 1 at 200 and 201. In each instance, the liner is reinforced over the central portion thereof which is subjected to the greatest internal pressure by means of a ring or rings closely encircling the central portion of the liner and which are so formed as to permit of the application of a cooling liquid directly to the exterior surface of the liner. In Figs. 1, 2 and 3, the liner is a single piece extending from one end to the other of the cylinder structure.

Figure 5:
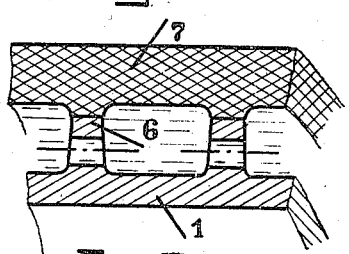
Figure 6:
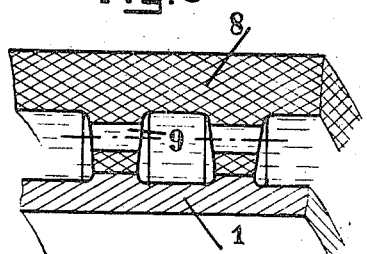

In Figs. 1, 2 and 3, the liner is indicated at 1. It is of relatively thin material so that it does not possess such a degree of strength as would enable it to withstand the pressure generated within the combustion chamber. Its strength is reinforced over the portion thereof bounding the combustion chamber by an encircling ring as indicated at 21 in Fig. 1 and at 22 in Fig. 2. Provision is made, however, for applying a cooling liquid directly to the surface of the liner over the portion of the liner encircled by the reinforcing ring, as in this way the heat absorbed by the liner is carried off more effectively and differences of temperature in different parts of the wall of the liner are reduced. In Fig. 1, the passages for the cooling liquid are shown at 23 as formed partly in the liner 1 and partly in the reinforcing ring 21. In Fig. 2, these passages are shown as formed within the reinforcing ring 22, whereas in Fig. 3 they are formed wholly within the liner 1. Fig. 5 shows the construction of the passages for the cooling liquid employed in Fig. 1, the ribs on the liner 1 being indicated at 6 and being shown as provided with transverse openings through which the cooling water may pass from one passage to the next adjacent one. The construction shown in Fig. 2 is illustrated on an enlarged scale in Fig. 6 where the ribs between adjacent passages for the water are shown as formed on the strengthening rib 8 and provided with transverse openings 9. The end portions of the cylinder structure may be constructed in the manner heretofore employed, as is indicated in the drawings. In Fig. 3, the reinforcing ring is shown as extended a greater distance toward the ends of the cylinder structure and formed of three separate parts 31, 32 and 33, which are connected together by suitable bolts 133.

Figure 4:
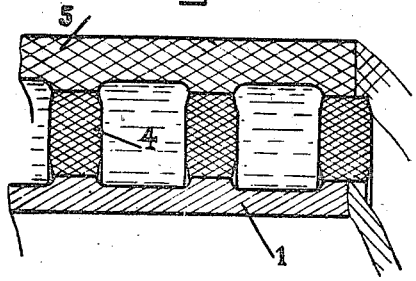
Figure 7:
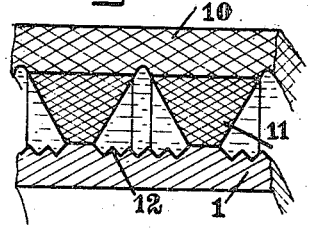
Figure 8:
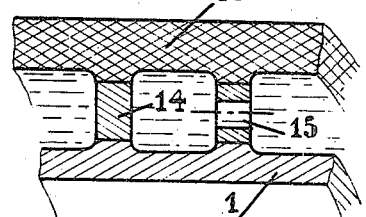
Figure 9:
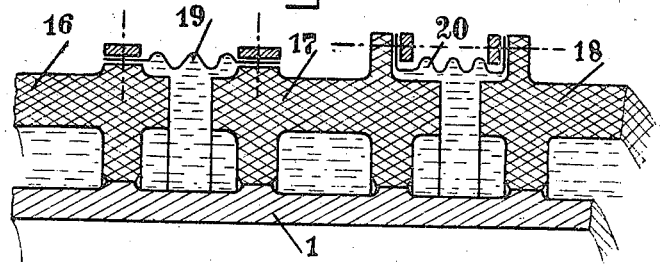

The reinforcement for the liner may consist of a plurality of rings spaced apart in the direction of the length of the cylinder structure, as is shown in Figs. 4, 7, 8, 9, 15 and 16, so that ample spaces are provided between the several rings for circulation of the cooling liquid in contact with the surface of the liner. In such a construction, the reinforcing ring may serve to provide a chamber for the cooling medium or a separate jacket or casing may be employed for this purpose. Fig. 4 shows a plurality of rings encircling the liner 1 to strengthen the latter and a jacket 5 closely encircling the rings 4; in such a construction both the rings 4 and the jacket 5 may constitute the reinforcement for the liner 1. In Fig. 7, the parts are shown as of a construction whereby the area of the liner with which the cooling liquid contacts is increased. For this purpose, the rings 11 within the jacket 10 are of trapezoidal cross-section so that they contact with the liner 1 over a relatively narrow area. Furthermore, between adjacent rings 11 the surface of the liner 12 is scored or grooved, as shown at 12, to increase the surface area thereof. In Fig. 8, the rings 14 closely encircling the liner 1 and surrounded by the jacket 13 are shown as provided with transverse openings 15 whereby the cooling liquid may pass from one channel to the next adjacent one. In Fig. 9, the reinforcing rings 16, 17 and 18 for the liner are shown in a duplex form, and adjacent rings are connected by flexible walls 20 to prevent the escape of the cooling water.

In all of these constructions, the parts may be so arranged as to afford a more thorough cooling of the wall of the liner over the portions thereof which would otherwise be heated to a higher degree; for instance, over certain portions of the liner a plurality of rings of relatively small thickness may be employed, whereas over another portion of the liner surface a less number of rings of greater width may be employed. The cooling effect may be further regulated if desired by agitation of the water, regulation of the rapidity of flow of the water, and otherwise, by methods heretofore proposed.

Figure 10:
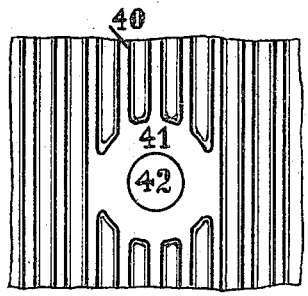
Figure 11:
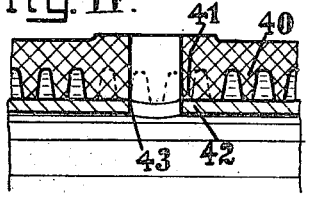
Figure 12:
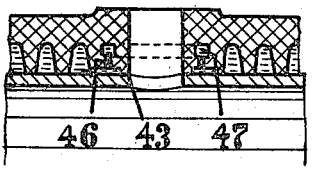
Figure 13:
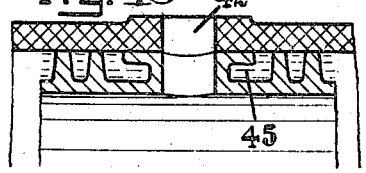
Figure 14:
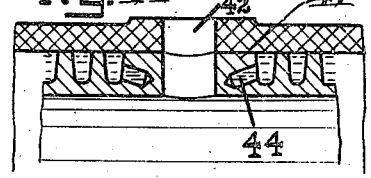

Figs. 10 to 17 show constructions which may be employed for providing special reinforcement of the portions of the cylinder structure where openings are provided leading to the interior of the structure. In Figs. 10 to 17, the ribs on the interior surface of the reinforcing ring or upon the exterior surface of the liner are united at a point where an opening for a valve or other device is to be provided, so as to form a solid ring which completely encircles that opening. In Figs. 10, 11 and 12, the opening is shown at 42 and this is surrounded by a ring 41 of solid metal integral with the reinforcing ring 40 and encircling an opening through the ring 40 which is adapted to aline with the opening in the liner. The ribs on the interior surface of the reinforcing ring are united adjacent to the opening 42 so as to form the strengthening ring 41. The ring 41 therefore forms a special reinforcement for the portion of the liner where the danger of breakage or distortion is greatest by reason of the presence of the opening for the valve. If the design be such as to require that the ring 41 be of specially large size, cavities 47 may be provided within the ring and connected by channels 46 with the passages for the cooling liquid so that the cooling liquid will be carried into sufficiently close proximity to the wall 43 of the opening leading to the interior of the cylinder. In Figs. 13 and 14, a slightly different construction is shown wherein the channels for the cooling liquid are provided in the liner instead of in the reinforcing ring and the ribs on the liner whereby these passages are formed are united at the opening 42 through the cylinder structure so as to form the ring 41 for reinforcing the structure around the opening 42. The passages for the cooling liquid are shown as extended at 45 in Fig. 13 and 44 in Fig. 14 in order to carry the cooling liquid close to the wall of the opening 42.

Figure 15:
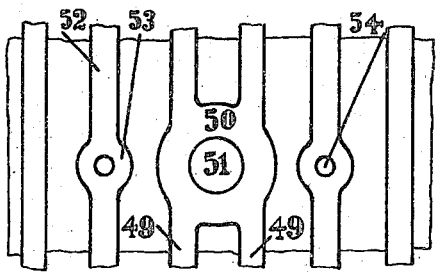
Figure 16:
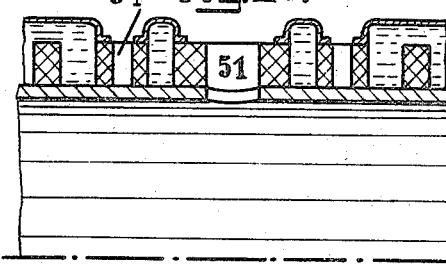

In Figs. 10 to 14, the reinforcing ring is shown as formed of a single part but if a plurality of separate rings be employed, as above mentioned, two or more adjacent rings may be connected together so as to form the reinforcement for the valve opening in the cylinder structure. Such a construction is shown in Figs. 15 and 16 where two of the rings 49 are shown as united by integral parts forming a ring 50 surrounding an opening 51 for the inlet valve of the engine. The adjacent rings 52 may be slightly enlarged as shown at 53 and perforated at 54 to receive the bolts by which the inlet valve projecting through the opening 51 may be secured in position.

In all of these constructions shown in Figs. 10 to 16, it will be seen that the opening leading to the interior of the cylinder structure for the reception of a valve device, which opening necessarily involves an element of weakness, is reinforced by a special strengthening device surrounding this opening so that the danger of breakage of the cylinder structure at this opening is greatly reduced.

Figure 17:
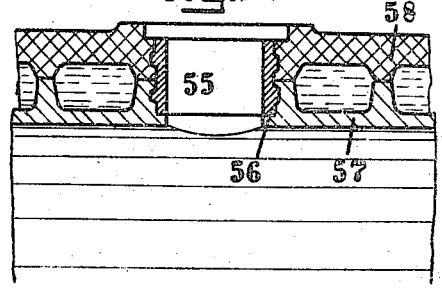

Fig. 17 shows another modification of the construction which may be employed about the valve opening. In this figure, 57 represents the liner and 58 the strengthening ring, the channels for the cooling liquid being formed partly in each of these two members. The valve projecting through the opening 55 to the combustion chamber is mounted wholly upon the reinforcing ring 58 so that the liner 57 will not be distorted or subjected to strain by mounting the valve in position. Both the liner 57 and reinforcement 58 are formed to provide rings which encircle the opening 55 and these rings abut against each other. To guard against the escape of cooling water between these two abutting surfaces, a valve box or sleeve 56 is secured in the opening 55 as shown.

What I claim is:

1. In an internal combustion engine, the combination of a cylinder structure and two pistons adapted to reciprocate therein in opposite directions simultaneously, the space between the two pistons at the center of the cylinder structure constituting an explosion chamber, a cylinder consisting of a liner of relatively thin material forming a guide for the pistons, and a reinforcing ring closely encircling the central portion of the liner, said ring and liner being formed to provide channels between them for a cooling medium which contacts directly with the liner, and the liner and ring being provided with alined openings leading to the combustion chamber for the reception of a valve casing; substantially as described.

2. In an internal combustion engine, the combination of a cylinder structure and two pistons adapted to reciprocate therein in opposite directions simultaneously, the space between the two pistons at the center of the cylinder structure constituting an explosion chamber, said cylinder structure consisting of a liner forming a guide for the pistons, a strengthening ring closely encircling the liner to reinforce the portion thereof adjacent to the combustion chamber, channels for a cooling liquid lying between the strengthening ring and the liner, said cylinder structure having an opening through the wall thereof leading to the combustion chamber for the reception of a valve mechanism and means for strengthening the wall of the cylinder adjacent to the said opening; substantially as described.

3. In an internal combustion engine of the type having two pistons reciprocating in opposite directions in a single cylinder simultaneously, a cylinder consisting of a liner forming a guide for the pistons, a strengthening ring closely encircling the central portion of the liner about the combustion chamber, channels for a cooling liquid lying between the strengthening ring and the liner, alined openings in the ring and liner leading to the combustion chamber for the reception of a valve casing, and means for reinforcing the liner about the said opening therein; substantially as described.

4. In an internal combustion engine of the type having two pistons reciprocating in opposite directions in a single cylinder simultaneously, a cylinder consisting of a liner forming a guide for the pistons, a strengthening ring closely encircling the central portion of the liner about the combustion chamber and channels for a cooling liquid lying between the strengthening ring and the liner, said liner and ring having alined openings therein leading to the combustion chamber and the metal of the ring and liner being so formed as to provide contacting surfaces thereon completely encircling said opening; substantially as described.

5. In an internal combustion engine of the type having two pistons reciprocating in opposite directions in a single cylinder simultaneously, a cylinder consisting of a liner forming a guide for the pistons, a strengthening ring closely encircling the central portion of the liner about the combustion chamber, channels for a cooling liquid lying between the strengthening ring and the liner, said liner and ring having an opening therethrough leading to the combustion chamber, and a ring of metal surrounding the said opening for reinforcing the liner entirely around the opening therein; substantially as described.

6. In an internal combustion engine of the type having two pistons reciprocating in opposite directions in a single cylinder simultaneously, a cylinder consisting of a liner forming a guide for the pistons, and a strengthening ring closely encircling the central portion of the liner about the combustion chamber and having channels formed in the interior surface thereof for a cooling liquid which contacts directly with the liner, said liner and ring having an opening therethrough leading to the combustion chamber and the channels adjacent to said opening being interrupted close to the opening to provide a ring of metal on said strengthening ring surrounding the opening and contacting with the liner to reinforce the portions of the liner about the opening therein; substantially as described.

7. In an internal combustion engine of the type having two pistons reciprocating in opposite directions in a single cylinder simultaneously, a cylinder consisting of a liner forming a guide for the pistons, a reinforcing ring surrounding the portion of the liner within which is the combustion chamber, channels for a cooling liquid lying between the reinforcing ring and the liner whereby the cooling liquid is carried into direct contact with the exterior of the liner, and alined openings in the liner and ring leading to the combustion chamber for the reception of a valve casing whereby the seat of the valve casing is in the ring and the valve casing may be secured to the ring; substantially as described.

8. In a cylinder for internal combustion engines and similar machines, the combination of a liner of thin material constituting a guide for the piston, a plurality of reinforcing rings closely encircling the liner to take up the stresses from the gas pressure and spaced apart lengthwise of the cylinder, certain of said reinforcing rings being united at points adjacent to an aperture in the cylinder wall by a ring surrounding the aperture, and a jacket encircling the liner and reinforcing rings and forming with them a space for the reception of a cooling medium which contacts directly with the liner; substantially as described.

In testimony whereof I affix my signature, in presence of two witnesses.

HUGO JUNKERS.

Witnesses:
  EMIL WERGIEN,
  HERMANN TISCHER.